(12) United States Patent
Laarakkers et al.

(10) Patent No.: US 8,656,457 B2
(45) Date of Patent: Feb. 18, 2014

(54) CONTROLLING LOCKING STATE TRANSITIONS IN A TERMINAL

(75) Inventors: Jeroen Laarakkers, Nootdorp (NL); Frank Muller, Delft (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 13/511,615

(22) PCT Filed: Nov. 23, 2010

(86) PCT No.: PCT/EP2010/068031
§ 371 (c)(1),
(2), (4) Date: May 23, 2012

(87) PCT Pub. No.: WO2011/064208
PCT Pub. Date: Jun. 3, 2011

(65) Prior Publication Data
US 2012/0291091 A1   Nov. 15, 2012

(30) Foreign Application Priority Data
Nov. 24, 2009   (EP) .................................... 09176826

(51) Int. Cl.
*H04L 9/00* (2006.01)
*G06F 11/00* (2006.01)

(52) U.S. Cl.
USPC ................................. 726/1; 726/22; 726/27

(58) Field of Classification Search
USPC .............. 726/1, 26–30, 34–35; 713/174, 193, 713/194; 455/26.1
See application file for complete search history.

(56) References Cited

U.S. PATENT DOCUMENTS 5,956,633 A * 9/1999 Janhila .......................... 455/410
6,138,005 A * 10/2000 Park ............................. 455/411

(Continued)

FOREIGN PATENT DOCUMENTS

EP   1653753 A1   3/2006
GB   2380356      4/2003

(Continued)

OTHER PUBLICATIONS

Arkko et al., "Extensible Authentication Protocol Method for 3rd Generation Authentication and Key Agreement (EAP-AKA)," Network Working Group, Request for Comments: 4187, Category: Informational, pp. 1-80 (Jan. 2006).

(Continued)

*Primary Examiner* — Hosuk Song
(74) *Attorney, Agent, or Firm* — McDonnell Boehnen Hulbert & Berghoff LLP

(57) ABSTRACT

A method for controlling locking state transitions in a terminal in accordance with one or more state transition rules, the method including the steps of providing at least one writable memory location comprising first state information associated with a first locking state of said terminal, said at least one writable memory being configured for an irreversible transition from said first locking state to a second locking state; receiving a request for a transition to said second locking state, said request comprising second state information associated with said second locking state; on the basis of said first and second state information and said state transition rules, checking whether said requested transition is allowable or not; and storing said second state information in said writable memory if said requested transition is allowable according to said state transition rules.

15 Claims, 5 Drawing Sheets

(56) References Cited

U.S. PATENT DOCUMENTS

| | | | |
|---|---|---|---|
| 6,381,477 B1 * | 4/2002 | Johnson et al. | 455/572 |
| 2008/0055276 A1 | 3/2008 | Chang | |
| 2008/0227432 A1 | 9/2008 | Lavabre et al. | |

FOREIGN PATENT DOCUMENTS

| | | |
|---|---|---|
| GB | 2380356 A | 4/2003 |
| JP | 2000076133 | 3/2000 |

OTHER PUBLICATIONS

ETSI: "Digital cellular telecommunications system (Phase 2+); Personalisation of GSM Mobile Equipment (ME); Mobile functionality specification (GSM 02.22 version 7.0.0 Release 1998)," ETSI TS 101 624 v7.0.0, GSM Global System for Mobile Communications (Aug. 1999), pp. 1-23.

"3rd Generation Partnership Project, Technical Specification Group Services and System Aspects; 3G Security; Access security for IP-based services (Release 10)," 3GPP TS 33.203 V10.1.0 (Oct. 2010), pp. 1-114.

Tripp, Gerald, A parallel "String Matching Engine" for use in high speed network intrusion detection system, J. Comput Virol (2006) 2:21-34.

PCT International Search report for Priority Application No. PCT/EP2010/068031, (2011).

EP Search Report for EP Priority Application No. 09176826.7, (2010).

* cited by examiner

CONTROLLING LOCKING STATE TRANSITIONS IN A TERMINAL

CROSS REFERENCE TO RELATED APPLICATIONS

The present application is a 35 U.S.C. 371 National Application of PCT/EP2010/068031 filed Nov. 23, 2010, which claims priority to European Patent Application No. 09176826.7, filed Nov. 24, 2009, the entire contents of which are incorporated entirely herein by reference.

FIELD OF THE INVENTION

The invention relates to controlling locking state transitions in a terminal and, in particular, though not necessarily, to a method and a control module for controlling locking state transitions in terminal, a terminal using such control module and a computer product program using such method.

BACKGROUND OF THE INVENTION

One of the most effective attacks on computer networks and servers is a Denial of Service (DOS) attack or a Distributed Denial of Service (DDOS) attack. Although a mobile network itself is not specifically vulnerable for these kinds of attacks, the individual mobile phones connected to it are. With modern mobile devices, like smart phones, all kinds of software applications may be downloaded. When distributed effectively, malicious code may cause the individual mobile device to become (temporarily) useless.

One of these threats relates to malware, which is capable of changing a personalization application of a mobile device. The personalization application is commonly known by the name of SIM lock. A personalization application, which is described in ETSI TS 101624, uses an indicator, typically a flag, within the memory of the device for indicating that the device is either in a locked or an unlocked state. A lock application may lock a mobile device to different types of information associated with the mobile device, such as the SIM card in the mobile device, a service provider and/or the network.

When a locked mobile phone is switched on, the application retrieves the relevant information from the SIM and verifies that it corresponds to the lock conditions stored in the memory of the mobile device. Unlocking a mobile device requires a secret unlock code which is stored in a database or calculated by a secret algorithm, typically using the IMEI which is stored in the memory of the mobile device. However, as the unlocking algorithm is often disclosed by hackers and the IMEI code of the phone is not located in the protected memory of the phone, it may be quite easy to determine the unlocking code. Further, the memory of a mobile telephone may not be sufficiently protected, allowing direct modification of the locking flag without using the unlock code. Furthermore, once a mobile phone is unlocked or if it was never locked for certain personalization categories in the first place (e.g. service provider or network), locking it, for example at a different SIM or a different network, can be done with a simple command; it does not require the knowledge of a secret code. This holds for all categories for which the personalization flag is set to 'off'.

Methods for controlling locking states transitions in a mobile terminal are known from US2008/227432 and GB2380356. These methods however do not describe ways for preventing malicious code from setting a mobile terminal back in its former locked state. It thus may be relatively easy to change the locking state of a mobile device resulting in an effective DOS attack. In case the distribution scale of the malicious code is large enough, which is relatively easy to achieve, a significant number of mobile devices could be taken out of operation, causing serious damage to users and mobile providers. Unlocking takes extremely time-consuming effort with mandatory human interaction.

Hence, there is a need in the art for methods and systems for controlling a transition from a current first locking state to a further second locking state, in particular the SIM locking state, of a mobile terminal.

SUMMARY OF THE INVENTION

It is an object of the invention to reduce or eliminate the described vulnerabilities of mobile devices. In a first aspect the invention may relate to a method for controlling locking state transitions in a terminal, preferably a mobile terminal, said terminal being configured for checking said transition in accordance to one or more state transition rules. The method may comprise the steps of: providing at least one writable memory location comprising first state information associated with a first locking state of said terminal, said at least one writable memory being configured for an irreversible transition from said first locking state to a second locking state; receiving a request for a transition to a second locking state, said request comprising second state information associated with said second locking state; on the basis of said first and second state information and said state transition rules checking whether said requested transition is allowable or not; and, storing said second state information in said writable memory if said requested transition is allowable according to said state transition rules.

Alternatively, the method may comprise the steps of: providing at least one writable memory location comprising first state information associated with a first locking state of said terminal, said at least one writable memory being configured for an irreversible transition from said first locking state to a second locking state; receiving a request for a transition to said second locking state, said request comprising second state information associated with said second locking state; on the basis of said first and second state information and said state transition rules, checking whether said requested transition is allowable or not; and, storing said second state information in said writable memory if said requested transition is allowable according to said state transition rules.

The invention uses the transitions rules associated with the Finite State Machine (FSM) description of the allowable locking states in the terminal and if the requested transition is allowable the terminal is irreversibly set to the requested allowable state. This way transitions to non-allowable locking states, e.g. induced by malicious code, may be prevented. Such a scheme thus provides a simple and efficient counter measure against Denial of Service (DOS) attacks against mobile terminals.

In one embodiment said terminal may comprise one or more combinatorial logic elements for implementing one or more of said state transition rules associated with one or more transitions in the one or more locking states of said terminal. In another embodiment said terminal may comprise one or more combinatorial logic elements configured for irreversibly setting said terminal to said second locking state if said requested transition is allowable according to said state transition rules. Providing a hardware implementation of the FSM using for example combinatorial logic elements may provide a control module which is robust against tampering by malicious code.

In other variants said terminal may comprise at least one feedback circuit for preventing transition to an earlier locking state and/or at least one non-resettable one-way binary counter and/or non-erasable non-volatile memory elements. Such hardware elements may efficiently prevent a mobile terminal to be set back to an earlier non allowable locking state. For example it prevents an unlocked or unlockable terminal to be set back into a locked state.

In yet another embodiment, the method may further comprise the step of, if said second locking state is allowable, setting at least one locking flag associated with the locking state of said terminal to said further locking state. If the logic circuit implementing the FSM determines that a requested transition is allowable, a state flag or a combination of state flags are set, indicating that a transition has occurred to a new allowable locking state. Such flag thus provides the direct result of the checking action of the logic circuit and may be used by a personalization application (e.g. a SIM lock application) in order to check whether such SIM lock is activated or not.

In another embodiment said mobile terminal may comprise at least three locking states, preferably at least a first locking state in which the mobile terminal is unlocked, a second locking state in which the mobile terminal is locked and a third locking state in which the mobile terminal is unlockable. In contrast with known two-state locking mechanisms, the present invention provides at least three stable locking states provides the advantage that a provider is free to choose whether or not to implement a SIM lock and is able to effectively prevent a terminal against DOS attacks.

In one embodiment a first transition from said first locking state to said second locking state and a second transition from said second state to said third state are allowable state transitions, preferably the only allowable state transitions, in said terminal. In another embodiment, a first transition from said first locking state to said second locking state, a second transition from said second state to said third state and a third transition from the first locking state to the third locking state are allowable state transitions, preferably the only allowable state transitions, in said terminal.

In one variant said first and/or second state information may comprise at least one state identifier, preferably a binary state identifier. In another variant said one-way writable memory location may comprise a non-volatile memory location, preferably an EEPROM, EPROM and/or flash memory location.

In another aspect, the invention may relate to a method of verifying personalization in a terminal, wherein said terminal comprises one or more combinatorial logic elements configured for storing said locking state in at least one writable memory location if said transition is allowable according to said state transition rules, said at least one writable memory being configured for an irreversible transition from said first locking state to a second locking state. The method may comprise the steps of: providing state information associated with the present locking state of said terminal; if said state information indicates that the terminal is in a locked state, comparing personalization information stored in said terminal with personalization information stored in an identity module associated with said terminal. In one embodiment said terminal may comprise one or more combinatorial logic elements configured for storing said locking state in a writable memory location if said transition is allowable according to said state transition rules.

In a further aspect, the invention may relate to a terminal, preferably a mobile terminal, wherein said terminal is configured for controlling locking state transitions in said mobile terminal in accordance to one or more state transition rules and wherein said terminal may comprise: at least one writable memory location for storing locking information associated with a first locking state of said terminal, wherein said at least one writable memory is configured for an irreversible transition from said first locking state to a second locking state; at least one input for receiving a request for a transition to a second locking state, said request comprising second state information associated with said second locking state; a logic circuit configured to check on the basis of said first and second locking information and said transition rules whether said requested transition is allowable or not; and, configured to store said second locking state in said writable memory location if said requested transition is allowable according to said transition rules.

In one embodiment, said terminal may comprise a logic circuit, wherein said logic circuit may comprise one or more combinatorial logic elements implementing one or more of said rules associated with one or more transitions in the one or more locking states of said terminal, said logic circuit further comprising at least a feedback circuit and/or a non-resettable one-way binary counter and/or non-erasable non-volatile memory elements for preventing a state transition to an earlier locking state.

In yet a further aspect, the invention may relate to a control module for use in a terminal, preferably a mobile terminal, wherein said control module is configured for controlling locking state transitions in said terminal and wherein said control module may comprise: at least one writable memory location for storing locking information associated with a first locking state of said terminal, said at least one writable memory being configured for an irreversible transition from said first locking state to a second locking state; at least one input for receiving a request for a transition to a second locking state, said request comprising second state information associated with said second locking state; a logic circuit comprising one or more combinatorial logic elements for implementing said one or more state transition rules and configured to check on the basis of said first and second locking information whether said requested transition is allowable or not; and, configured to set said writable memory location to said second locking state if said requested transition is allowable according to said transition rules; said logic circuit may further comprise a locking state indicator, preferably a locking flag, for indicating current locking state of said terminal.

The invention may also relate to a computer program product, wherein the computer program product comprises software code portions configured for, when run a computer, executing the method according to any of the method steps as describe above.

The invention will be further illustrated with reference to the attached drawings, which schematically show embodiments according to the invention. It will be understood that the invention is not in any way restricted to these specific embodiments.

DETAILED DESCRIPTION

Figure 1:
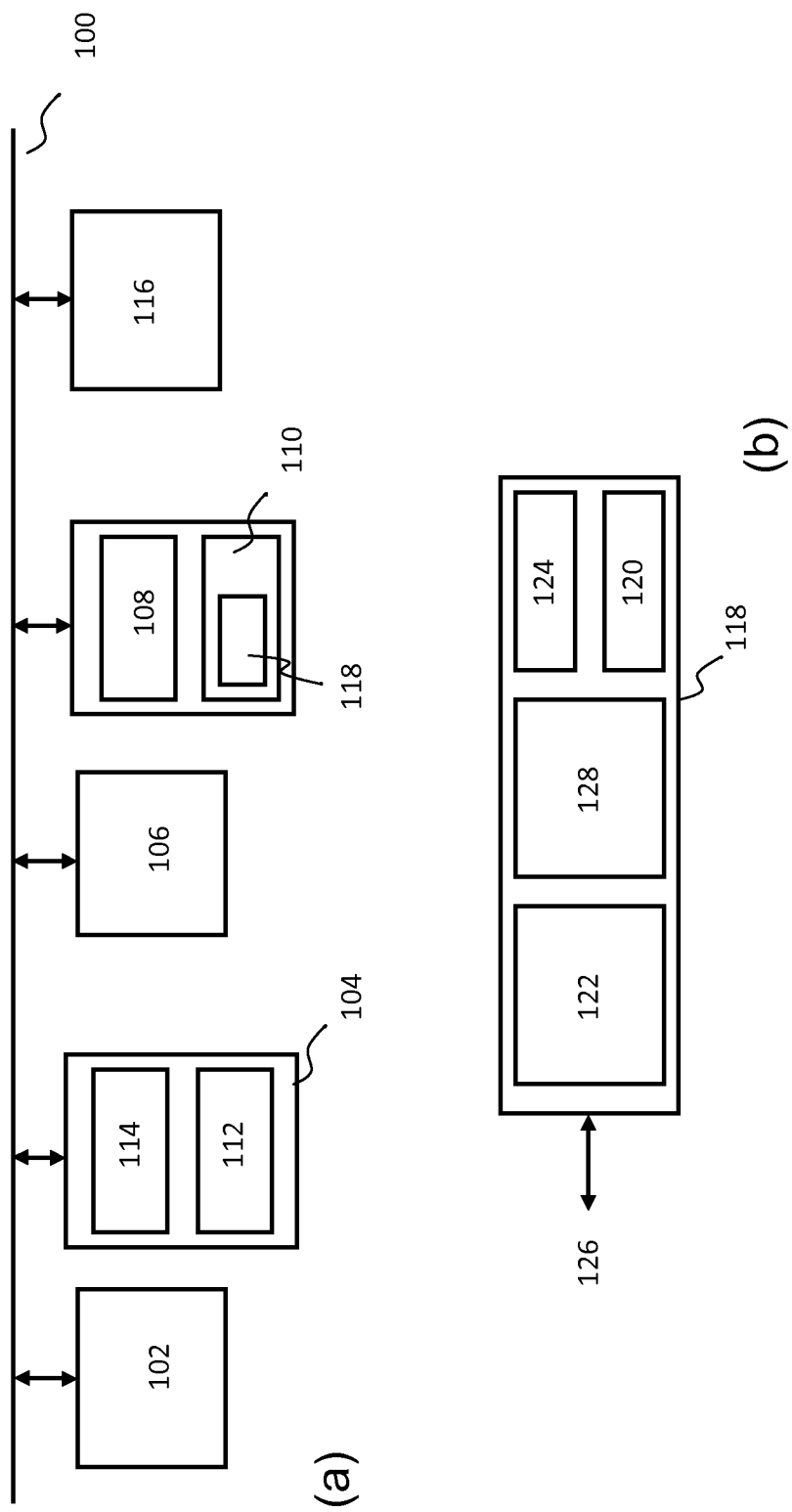
FIG. 1 depicts a schematic of at least part of a mobile terminal comprising a locking module according to one embodiment of the invention.

FIG. 1 (a) depicts a schematic of at least part of a mobile terminal according to one embodiment of the invention. The terminal may comprise a radio transceiver 102, a controller 104, a user interface 106 comprising Input/Output (I/O) devices, a memory comprising one or more volatile (RAM) 108 and non-volatile (ROM, EPROM, EEPROM and/or flash) memory modules 110 which are communicatively coupled to a central data bus 100. The controller may comprise one or more Central Processing Units (CPUs) 112 and an Operating System (OS) 114 for managing the resources of the terminal. Application Programming Interfaces (APIs) associated with the OS may allow application programs to access services offered by the OS. For example, one API may be configured for setting up wired or wireless connections to a communications network. Mobile service applications stored in the memory may be executed by the terminal thereby providing the user access to various wireless telecommunications and multimedia services offered by the network.

The terminal may be implemented as any type of device capable of providing wireless communications services, including a personal digital assistant (PDA), a smart phone and "soft" phones, executed as software codes of a computer program stored in a data carrier of a personal computer, a hand held or a lap-top or the like.

The terminal may further comprise an identity module 116, which is coupled via an interface to the controller. The identity module may allow authentication and/or registration of the terminal to the network. The identity module typically comprises a processor and one or more memory components (e.g. ROM, RAM and/or EEPROM) and I/O circuits. For authentication purposes it may comprise a secret service-subscriber authentication key K, a subscriber identity IMSI and one or more algorithms used in the authentication procedure with the network.

The identity module may be a UICC (Universal Integrated Circuit Card) for use in mobile devices suitable for 2G-type networks (GSM) or 3G-type networks, (UMTS). To that end the UICC may comprise a Subscriber Identity Module (SIM) comprising SIM applications and/or a UMTS Subscriber Identity Module (USIM) comprising USIM applications. In further embodiments, the identity module may be related to an IP Multimedia Sub-system SIM (ISIM) for authenticating and accessing IMS-based services according to a predetermined IMS-based Authentication and Key Agreement (AKA) as for example described in ETSI technical specification TS 33.203 or an extensible authentication protocol (EAP) based SIM for authenticated and accessing a network according to a predetermined EAP-based AKA as described for instance in RFC4187.

At least one non-volatile memory module 110 in the terminal may comprise a control module 118 for controlling state transitions between the allowable locking states of the mobile terminal. A locking state of the terminal may relate to one of the different locking configurations of the terminal. For example, a locking state may relate to a terminal configured by a provider to be SIM locked to one particular network operator or to a configuration wherein the terminal is configured to be unlocked.

FIG. 1 (b) depicts a schematic of a more detailed overview of the control module according to one embodiment of the invention. The control module may comprise locking information 120, e.g. SIM lock information as described in ETSI TS 101624, which is used by a personalization application such as a SIM lock application, stored in the memory of the terminal. Locking information may comprise for example the country Mobile Country Code (MCC), the Mobile Network Code (MNC), service provider (SP) and Corporate information for SIMs supporting the GID1 and GID2 file and/or the SIM Group code. After turning on the power and/or after providing the terminal with a new UICC, the personalization application may check whether the terminal is in a locked state or not and—if it is in the locked state—compare the locking information with information (e.g. the IMSI) stored in the UICC. If the comparison fails in the sense that the locking information and the information in the UICC do not match correctly, a terminal may enter into the limited service state in which only emergency services may be available to the user.

The control module may further comprise one or more memory locations for securely storing locking state information 122 and one or more flags 124 indicating the current locking state the terminal is in. By offering a particular state code to an input 126 of the control module, the present locking state of the terminal may be altered to the locking state associated with the state code offered at the input of the control module. The allowability of such a transition in the locking state of the terminal may be checked by a circuit 128 in the control module. In one embodiment, the circuit may comprise combinatorial logic elements for checking whether the transition is allowed according to one or more state transition rules. If the transition in the locking state is allowed, the logic circuitry may set one or more locking flags associated with the new locking state. If the transition is not allowed the locking flag will remain to its present allowable state.

Hence, by providing a state code to the input of the control module in the terminals, a mobile provider may configure its mobile terminals according to its business model, e.g. locked or unlocked or any other locking state associated with its locking scheme. The state code and/or the locking flag should be retained by the terminal when the power of the terminal is switched off. Therefore, the one or more memory locations used by the control module may be writable, non-volatile memory such as an (E)EPROM and/or a flash memory. In order to protect the locking flag used by the personalization application from being altered by a malicious program or other unauthorized sources, the control module is configured according to one or more advantageous schemes as described hereunder with reference to FIG. 2-5.

Figure 2:
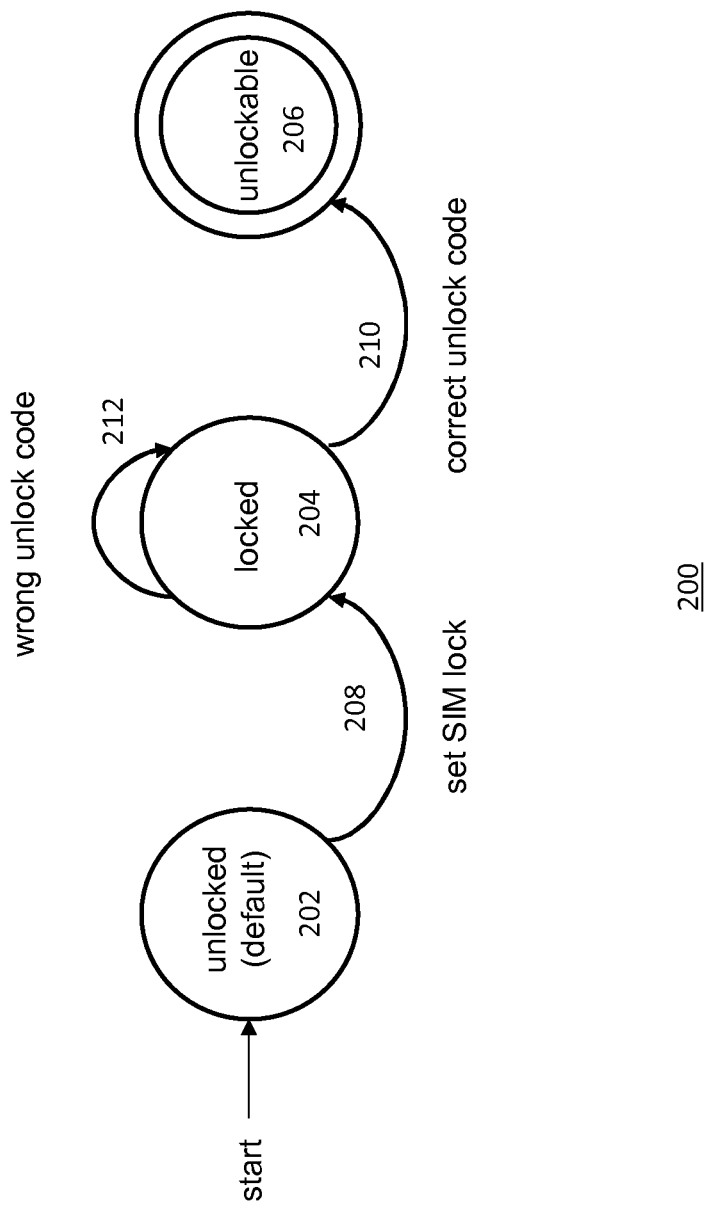
FIG. 2 depicts a locking scheme according to one embodiment of the invention.

FIG. 2 depicts a locking scheme according to one embodiment of the invention. In particular, FIG. 2 depicts a finite state model (FSM) description of a locking scheme 200 comprising three different sequentially allowable locking states 202,204,206 in which the mobile terminal may exist. The first state "unlocked" 202 may for example relate to the factory default. In that case the mobile terminal may not be locked to any type of information. The second state may represent a locked state "locked" 204 as specified by the mobile provider. For example, a provider may want to lock the mobile terminal to its own network. This type of locking is typically done to prevent the mobile terminal to be used in collaboration with other network providers. In most countries, this is a legal setting.

As will be explained hereunder in more detail, a transition 208 from the "unlocked" state to the "locked" state is possible only once. Further, from the second locked state only a transition 210 to a further third state "unlockable" is possible wherein the terminal may be unlocked. This third locking state is the last and final possible state of the terminal. Transitions from one locking state to a next locking state which are allowed under the FSM description of the locking scheme are made irreversible so that transitions to previous states and the consequences in terms of vulnerability, are made impossible.

By implementing the control module in the terminal according to the three-state, one-way FSM as depicted in FIG. 2, a locking scheme is provided which allows a mobile provider to choose its locking scheme according to its business model which is resistant against misuse such as malicious programs trying to change the locking state associated with a SIM lock in the terminal. Ways for achieving such functionality will be described hereunder in more detail.

In the embodiment of FIG. 2, a provider may for example irreversibly set its mobile devices from the default "unlock" state to the "locked" state so that the only future option is unlocking it, bringing the mobile device to "unlockable" state. In the "locked state" transitions 212 to other locked states e.g. a change to another country, network etc., are not possible as the mobile device is already locked in the correct way. Further, a provider that does not use SIM locking, either for commercial or legal reasons, may irreversibly set its mobile terminals in the "unlockable" state so that the mobile terminals are prevented from being locked again.

TABLE 1 state transition table of the FSM

| Input | Current state | New state | Output |
|---|---|---|---|
| Set SIM lock | S1: unlocked | S2: locked | — |
| Release SIM lock (plus unlock code) | S2: locked | S3: unlockable | — |
| Any | S3: unlockable | S3: unlockable | — |

Table 1 depicts the so-called state transition table of the FSM as depicted in FIG. 2, showing the three different locking states in which the mobile terminal may exist. Input events (sometimes also referred to as messages) refer to events that may cause a control module in which the FSM is implemented to change the state the terminal is in. For example, an input event may be a signal generated by the manufacture or the mobile operator comprising a command for setting the mobile device to a particular state. Alternatively, an input event may be a signal originating from a malicious program or other sources designed for illegally altering the locking state of the mobile device. Further, output events refer to an action that takes place after an input event arrives at a state machine. Further, a transition is a link between two states; it has a source state and a target state and is triggered by an input event. The triggering may also cause the launching of one or more output-events.

In advantageous embodiments of the invention allowable transitions from one locking state to another locking state is an irreversible process. Irreversibility may be implemented in hardware by means of a register that for example may be increased, but not decreased from its nature. Hardware components offering such irreversible mechanisms include (E)EPROMs, flash memory cells or one-way writeable memory modules. Suitable implementations of the FSM may require at least one register to store the state variables, e.g. a state code in a binary or other suitable representation, and a block of combinational logic for determining the allowability of a state transition. Optionally, a second block of combinational logic may be provided to determine the possible output of an FSM.

In one embodiment the following state codes may be to assigned to the three allowable states:
S1 (Unlocked): 00
S2 (Locked): 01
S3 (Unlockable): 11

In order to check whether a transition to another state is allowed, a state register, i.e. a memory location containing the state code, may need to be checked. A transition to the state "locked" is only possible from the state "unlocked", i.e. when the value is "00". A transition from "locked" to "unlockable" is only possible when the current state is "01". When the correct secret unlock code is generated and the state code "11" is provided to the input of the control module, the terminal may be set to the "unlockable" state by writing the state code "11" into the one-way writable state register. From the "unlockable" state no further transitions are possible.

By storing the state code of the present allowable locking state in a register, it may be easily tested whether or not a transition to a further locking state is allowed or not. Preferably, this register may be located in a non-volatile memory, because its value should be retained when the mobile phone is powered down. The state register may therefore advantageously be implemented in EPROM or EEPROM. If EEPROM is chosen, the erasing could be disabled to make the solution more secure.

Figure 3:
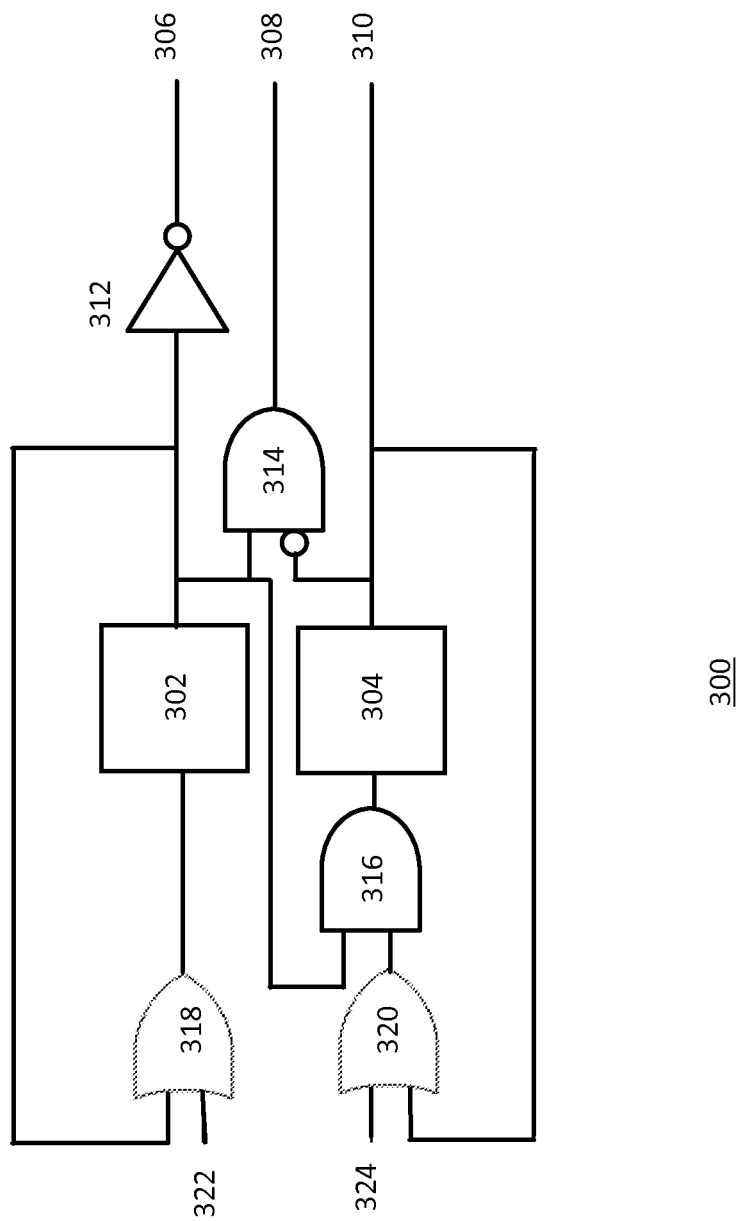
FIG. 3 depicts a hardware implementation of the locking scheme according to one embodiment of the invention.

FIG. 3 depicts a hardware implementation of the locking scheme 300 according to one embodiment of the invention. The register may be implemented as two memory elements labelled LSB (Least Significant Bit) 302 and MSB (Most Significant Bit) 304. The LSB represents the right bit of a state code and the MSB the left bit. The flags 306,308,310 on the output of the binary circuit may indicate in which locking state the mobile terminal is in. As explained hereunder, only one of these flags may be high ('1') at a time.

The starting state may be the factory default wherein both the LSB and MSB are low ('0'). In that case the Unlocked flag 306 will be high ('1'), as the output of the LSB is inverted by the invertor (in this case a NOT-gate) 312. Further, the Locked flag 308 will be low because the input from the LSB to the AND-gate 314 is low and both inputs need to be high in order to get a high on the output. Note that the output of the MSB is inverted before it is input to the AND-gate 314. The Unlockable flag 310 will be low because the MSB is low.

In a similar way, writing the state code 01 into the memory locations results in the LSB to be high and the MSB to be low. The Unlocked flag will be low because of the NOT-gate, the locked flag will be high and the Unlockable flag will be low. Finally, if the LSB and the MSB are both made high, the unlocked flag will be low and the Unlockable flag will be high.

The binary circuit is configured such that when the memory element, either the LSB and/or MSB, is set to high, it is prevented from being reset back to low because the outputs of each memory elements is fed back via an OR-gate 318,320 to its input. This way, the memory elements form one-way irreversible memory locations in the sense that both the LSB and the MSB may only be set from low to high but not the other way around. Further, as an OR-gate has a high output if one or both of its inputs are high, it prevents resetting the state machine to an older state. The output of the LSB is fed back to an AND-gate 316 at the input of the MSB thereby ensuring that the MSB can only be set to high after the LSB has become high. Hence, unauthorized attempts trying to rewrite the memory locations through the input 322,324 in order to set the mobile terminal to a locking state which is not allowable according to the FSM will fail.

The state flags depicted in FIG. 3 may be used in a SIM lock procedure, typically a proprietary procedure, in mobile terminals. The ETSI specification TS 101624 only describes that a SIM lock procedure (in the specification referred to as a "personalization" mechanism) must be present, but it does not describe how such procedure should be implemented. The specification does state, however, that the so-called personalization indicator, i.e. the locking flag, must be checked. If it is set to "off", the personalization procedure should be stopped and the mobile terminal goes into the normal mode of operation, omitting the remaining steps of the procedure. If it is set to "on", the personalization check must be carried out.

Hence, in accordance with embodiment of the invention, the personalization application, e.g. the SIM lock application, may first check the state flag as set by the logic elements of the control module in order to check whether a personalization procedure is required or not. As this flag is a direct result of the binary logic in the control module (i.e. a hardware implementation of the FSM description of the locking scheme), it provides a reliable source regarding the locking state of the mobile terminal which is hard to compromise by malicious code. In particular, the control module comprising a hardware implementation of the FSM of the locking scheme, may provide a simple solution for effectively preventing SIM locking methods to be used for (D)DOS attacks.

It is to be understood that other combinational logic elements may also be used to implement the described functionality. For example it is well known in the field of electronic binary logic that all desired logic behaviour may be implemented by solely using NAND-gates. Further, other state code schemes may be used by the control module. In one embodiment for example the following notation may be used:

S1 (Unlocked): 00
S2 (Locked): 01
S3 (Unlockable): 10

Using this notation, the FSM may be implemented by using a not-resettable, one-way binary counter. Before allowing a state transition, the logic may check whether the value of the counter corresponds with the appropriate value for that transition. Other implementations using other binary schemes for representing states may also be possible.

From a security point of view it may also be advantageous to make a transition from the state "unlocked" directly to the state "unlockable" allowable. One purpose of a SIM-lock may be to prevent customers that have bought a mobile terminal subsidized by a certain network operator from using it with a subscription of other network operators. By locking the customer to a network of an operator for some time, the operator may recover the cost of subsidizing the mobile terminal. Sometimes, however, an operator may sell mobile terminals without a SIM-lock, for example when the customer pays the full price of the mobile phone. In that case there is no need for an operator to limit the customer to a subscription with his network and may allow combining it with a subscription of a different operator.

Figure 4:
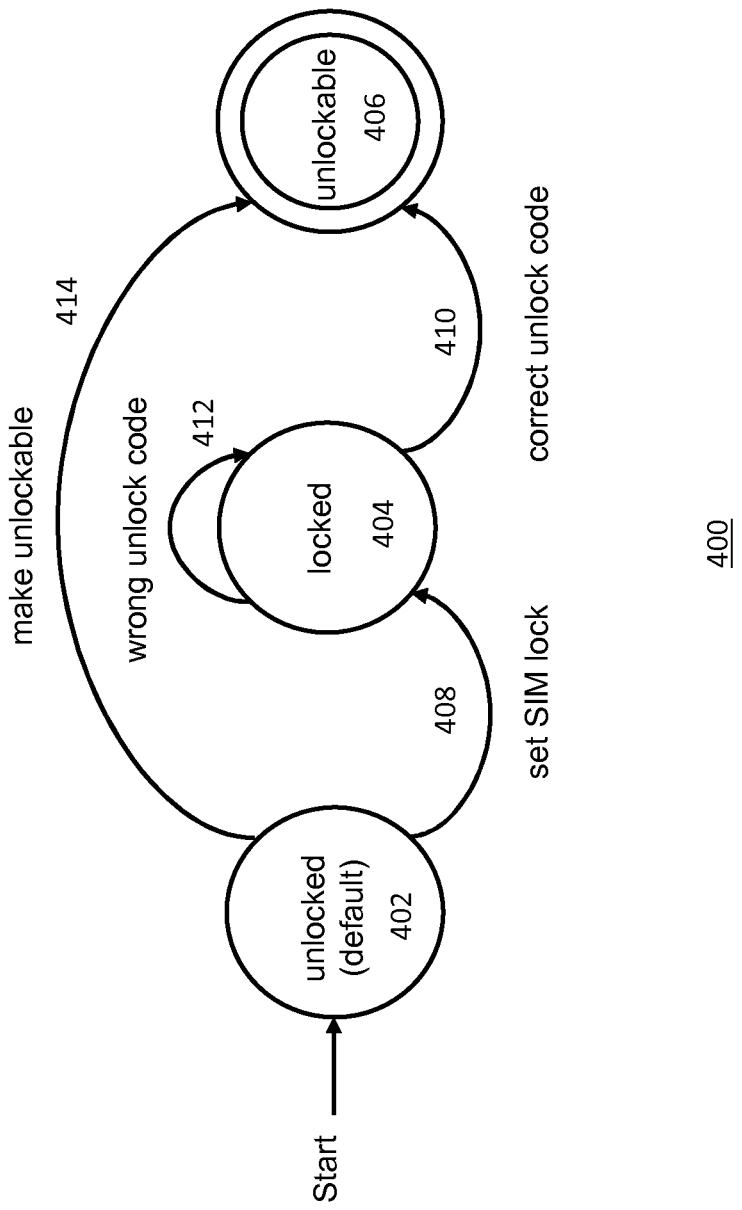
FIG. 4 depicts a locking scheme according to another embodiment of the invention.

Hence, in order to prevent the possibility of a (D)DOS attack by leaving the terminal in the state Unlocked and to save an operator the trouble of first locking the phone and then unlocking it again, the FSM may allow the transition from the state "unlocked" directly to the state "unlockable". The FSM associated with such locking scheme is depicted in FIG. 4. In addition to the allowable states 402,404,406 and transitions 408,410,412 as described with reference to FIG. 2, this FSM further comprises an allowable transition 414.

Figure 5:
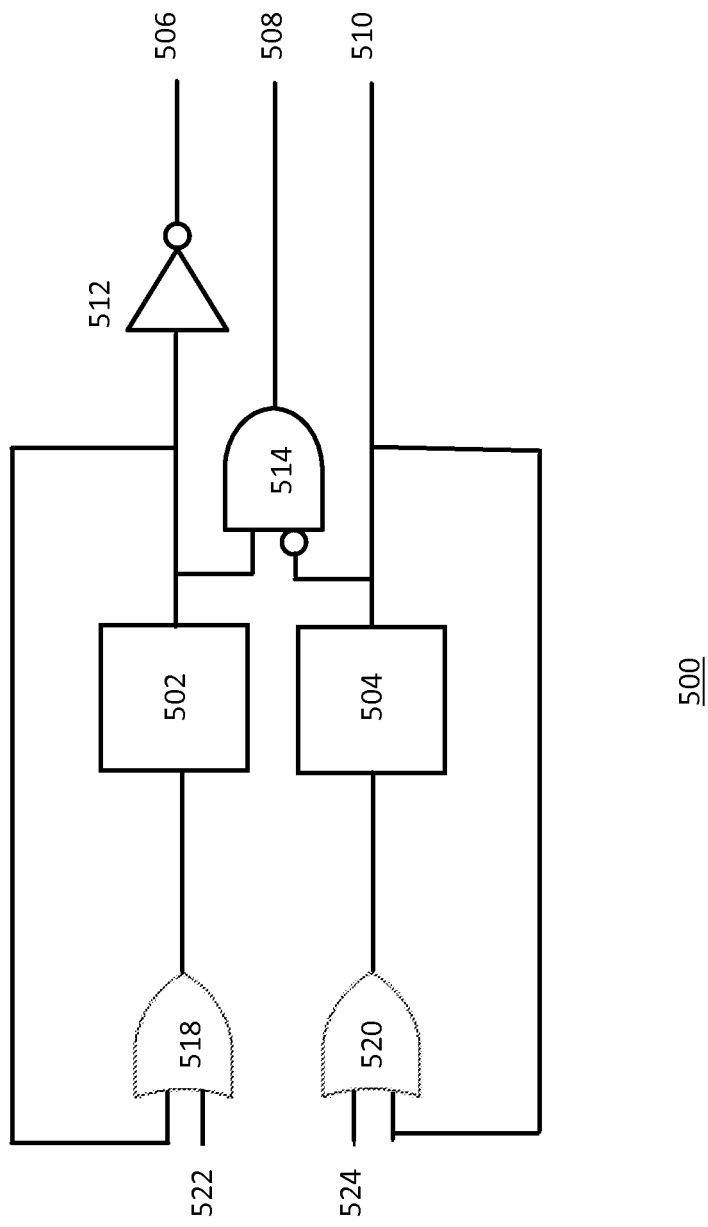
FIG. 5 depicts a hardware implementation of the locking scheme according to another embodiment of the invention.

FIG. 5 depicts a finite state model (FSM) for using in a control module according to an embodiment in which a direct transition from "unlock" to "unlockable" is allowed. The FSM may be implemented using the same logic elements 502,504,512,514,518,520 used in the FSM described with reference to FIG. 3 whereby the AND-gate at the input of the MSB memory cell is omitted and whereby the same coding scheme is used (i.e. S1 (Unlocked): 00; S2 (Locked): 01 (so MSB=0, LSB=1) and S3 (Unlockable): 11).

If the memory elements are programmed wrongly, the code "10" may be obtained, which is not a defined state. Such code may generate an ambiguous situation of the output flags in the sense that both the unlocked and unlockable flags are set to high. This ambiguous situation may be avoided by adding some additional logic.

Hence, from the above it follows that the invention allows a mobile terminal to have three possible states: "unlocked", "locked" and "unlockable". When an operator receives the mobile phones from the manufacturer, the phones are in the state "unlocked". The operator normally sells the phones with a discount in exchange for restrictive use of these phones to its own network for a predetermined period. To do so, an operator may provide a SIM lock on the phone. In that case, the phone is in the state "locked". After the SIM lock period has expired, the operator may release a code to unlock the phone. The invention allows the phone to go to the state "unlockable" after which it can never be locked any more. This way, Denial of Service attacks are prevented in which malware on the mobile phone locks it to a different SIM or network. To achieve this goal, all state transitions according to the invention are irreversible.

In one embodiment is also possible to go from the state "unlocked" directly to the state 'unlockable'. This may be used if the operator does not want to put a SIM lock on the phone, but does want to protect it against Denial of Service attacks.

It is to be understood that any feature described in relation to any one embodiment may be used alone, or in combination with other features described, and may also be used in combination with one or more features of any other of the embodiments, or any combination of any other of the embodiments. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Moreover, the invention is not limited to the embodiments described above, which may be varied within the scope of the accompanying claims. It is clear for a skilled person that using the FSM as described with reference to the various embodiments described in this application, more complex business models comprising more locking states and/or more (non)allowable state transitions may be implemented in a hardware model which is difficult to compromise by malicious code without departing from the scope of the invention.

The invention claimed is:
1. A method for controlling locking state transitions in a terminal in accordance with one or more state transition rules, the method comprising the steps of:

providing at least one writable memory location comprising first state information associated with a first locking state of said terminal, said at least one writable memory being configured for an irreversible transition from said first locking state to a second locking state;

receiving a request for a transition to said second locking state, said request comprising second state information associated with said second locking state;

on the basis of said first and second state information and said state transition rules, checking whether said requested transition is allowable or not; and storing said second state information in said writable memory if said requested transition is allowable according to said state transition rules.

2. The method of claim 1, wherein said terminal comprises one or more combinatorial logic elements for implementing one or more of said state transition rules associated with one or more transitions in the one or more locking states of said terminal.

3. The method of claim 1, wherein said terminal comprises one or more combinatorial logic elements configured for irreversibly setting said terminal to said second locking state if said requested transition is allowable according to said state transition rules.

4. The method of claim 1, wherein said terminal comprises a feedback circuit for preventing a state transition to an earlier locking state and/or a non-resettable one-way binary counter.

5. The method of claim 1, wherein said method further comprises the step of:
if said second locking state is allowable, setting at least one locking flag associated with the locking state of said terminal to said second locking state.

6. The method of claim 1, wherein said terminal comprises at least three locking states, at least a first locking state in which the terminal is unlocked, a second locking state in which the terminal is locked and a third locking state in which the terminal is unlockable.

7. The method of claim 6, wherein a first transition from said first locking state to said second locking state and a second transition from said second state to said third state are allowable state transitions, and are the only allowable state transitions, in said terminal.

8. The method of claim 6, wherein a first transition from said first locking state to said second locking state, a second transition from said second state to said third state and a third transition from the first locking state to the third locking state are allowable state transitions, and are the only allowable state transitions, in said terminal.

9. The method of claim 1, wherein at least one of said first and said second state information comprises at least one binary state identifier.

10. The method of claim 1, wherein said one-way writable memory location comprises a non-volatile memory location, preferable an EEPROM, EPROM or/or flash memory location.

11. A method of verifying personalization in a terminal, wherein said terminal is configured for controlling locking state transitions in said terminal in accordance with one or more state transition rules and wherein said terminal comprises one or more combinatorial logic elements configured for storing said locking state in at least one writable memory location if said transition is allowable according to said state transition rules, said at least one writable memory being configured for an irreversible transition from said first locking state to a second locking state, the method comprising the steps of:

providing state information associated with the present locking state of said terminal; and if said state information indicates that the terminal is in a locked state, comparing personalization information stored in said terminal with personalization information stored in an identity module associated with said terminal.

12. A terminal configured for controlling locking state transitions in said terminal in accordance to one or more state transition rules, said terminal comprising:

at least one writable memory location for storing locking information associated with a first locking state of said terminal, said at least one writable memory being configured for an irreversible transition from said first locking state to a second locking state;

at least one input for receiving a request for a transition to a second locking state, said request comprising second state information associated with said second locking state; and a logic circuit configured to check on the basis of said first and second locking information and said state transition rules whether said requested transition is allowable or not, the logic circuit further configured to set said writable memory location to said second locking state if said requested transition is allowable according to said transition rules.

13. The terminal of claim 12, wherein said logic circuit comprises one or more combinatorial logic elements implementing one or more of said rules associated with one or more transitions in the one or more locking states of said terminal, said logic circuit comprising at least a feedback circuit and/or a non-resettable one-way binary counter for preventing a state transition to an earlier locking state.

14. A control module for use in a terminal, said control module being configured for controlling locking state transitions in said terminal, said control module comprising:

at least one writable memory location for storing locking information associated with a first locking state of said terminal, said at least one writable memory being configured for an irreversible transition from said first locking state to a second locking state;

at least one input for receiving a request for a transition to a second locking state, said request comprising second state information associated with said second locking state; and a logic circuit comprising one or more combinatorial logic elements for implementing said one or more state transition rules and configured to check on the basis of said first and second locking information whether said requested transition is allowable or not, the logic circuit configured to set said writable memory location to said second locking state if said requested transition is allowable according to said transition rules, said logic circuit further comprising a locking state indicator, for indicating current locking state of said terminal.

15. A non-transitory computer-readable medium comprising software code portions configured for, when run by a computer comprising a processor, executing a method, the method comprising the steps of:

providing at least one writable memory location comprising first state information associated with a first locking state of said terminal, said at least one writable memory being configured for an irreversible transition from said first locking state to a second locking state;

receiving a request for a transition to said second locking state, said request comprising second state information associated with said second locking state;

on the basis of said first and second state information and said state transition rules, checking whether said requested transition is allowable or not; and storing said second state information in said writable memory if said requested transition is allowable according to said state transition rules.

* * * * *